(12) United States Patent
Baron et al.

(10) Patent No.: US 7,245,229 B2
(45) Date of Patent: Jul. 17, 2007

(54) DRILL STRING ROTATION ENCODING

(75) Inventors: Emilio Baron, Cypress, TX (US);
Stephen Jones, Cypress, TX (US)

(73) Assignee: PathFinder Energy Services, Inc., Houston, TX (US)

( * ) Notice: Subject to any disclaimer, the term of this patent is extended or adjusted under 35 U.S.C. 154(b) by 344 days.

(21) Appl. No.: 10/882,789

(22) Filed: Jul. 1, 2004

(65) Prior Publication Data

US 2005/0001737 A1    Jan. 6, 2005

Related U.S. Application Data

(60) Provisional application No. 60/484,042, filed on Jul. 1, 2003.

(51) Int. Cl.
*G01V 3/00* (2006.01)
(52) U.S. Cl. ............... 340/853.3; 702/9; 340/853.1
(58) Field of Classification Search .......... 367/82; 340/853.1, 853.4, 853.3; 175/38, 76, 57; 702/9
See application file for complete search history.

(56) References Cited

U.S. PATENT DOCUMENTS

| | | | |
|---|---|---|---|
| 3,298,449 A | 1/1967 | Bachman et al. | |
| 3,967,680 A | 7/1976 | Jeter | 175/38 |
| 4,354,233 A | 10/1982 | Zhukovsky et al. | |
| 4,655,299 A | 4/1987 | Schoeffler | |
| 4,763,258 A * | 8/1988 | Engelder | 340/853.3 |
| 5,065,825 A | 11/1991 | Bardin et al. | |
| 5,603,386 A | 2/1997 | Webster | |
| 6,267,185 B1 * | 7/2001 | Mougel et al. | 175/57 |
| 6,608,565 B1 * | 8/2003 | Van Steenwyk et al. | 340/855.4 |

FOREIGN PATENT DOCUMENTS

| | | |
|---|---|---|
| GB | 2172324 | 7/1986 |
| GB | 2177738 | 1/1987 |
| GB | 2282165 | 3/1995 |
| GB | 2356207 A | 5/2001 |
| GB | 2358651 A | 8/2001 |
| WO | WO-90/07625 | 7/1990 |
| WO | WO-90/08245 | 7/1990 |
| WO | WO-01-1191 A1 | 2/2001 |

* cited by examiner

Primary Examiner—Albert K. Wong

(57) ABSTRACT

A method for communicating with a downhole device is provided. The method includes predefining an encoding language including codes understandable to the device, the codes represented in the language as predefined value combinations of drill string rotation variables such as rotation rate or duration. The method further includes rotating a drill string at first and second rates and measuring the rotation rates downhole. The first measured rotation rate is processed downhole in combination with the second measured rotation rate to acquire a code in the language at the downhole device. Embodiments of the invention are useful, for example, for transmitting commands from the surface to a downhole device such as a directional drilling tool. Exemplary embodiments of this invention advantageously provide for quick and accurate communication with a downhole device without substantially interrupting the drilling process.

44 Claims, 8 Drawing Sheets

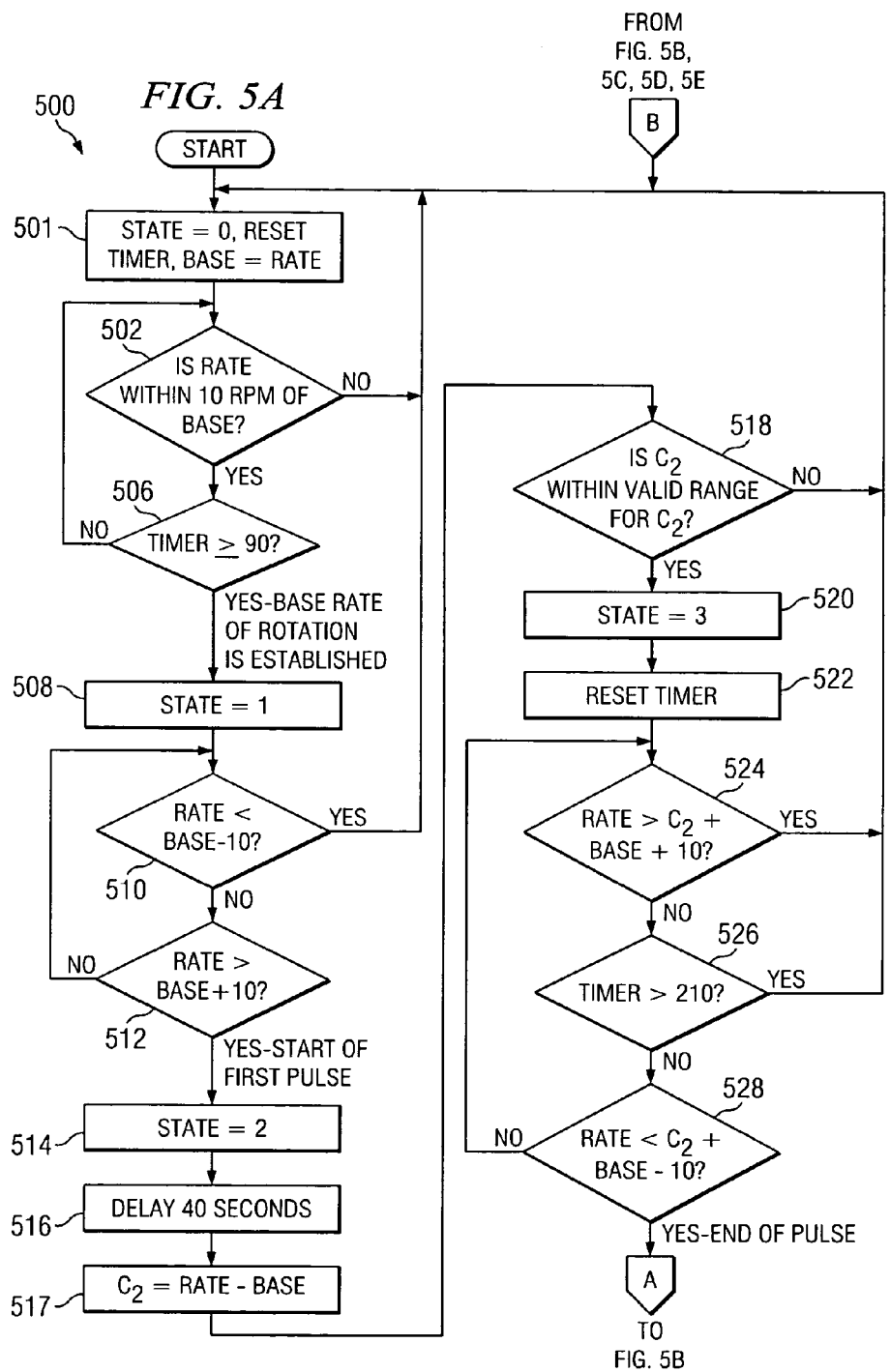

DRILL STRING ROTATION ENCODING

RELATED APPLICATIONS

This application claims the benefit of U.S. Provisional Application Ser. No. 60/484,042 entitled Encoding Data in a Sequence of Rotational Speed Variations of a Drill String, filed Jul. 1, 2003.

FIELD OF THE INVENTION

This invention, in exemplary embodiments, relates to the field of oil well drilling, and in particular, to methods and apparatus for communicating information between the surface and a downhole device and more particularly, to methods and apparatus for encoding information in predefined sequences of varying rotation rates of the drill string.

BACKGROUND OF THE INVENTION

Oil and gas well drilling operations commonly include the use of sensors deployed downhole as a part of the drill string to acquire data as the well bore is being drilled. This real-time data may provide information about the progress of the drilling operation and the earth formations surrounding the well bore. Significant benefit may be obtained by improved control of downhole sensors from the rig floor or remote locations. For example, the ability to send commands to downhole sensors that selectively activate the sensors can conserve the battery life of the sensors and increase the amount of downhole time a sensor is useful.

Directional drilling operations are particularly enhanced by improved control. The ability to efficiently and reliably transmit commands from a driller to downhole drilling hardware can be essential, in many situations, to accurate well bore positioning. Downhole drilling hardware that, for example, deflects a portion of the drill string to steer the drilling tool is typically more effective when under tight control by a driller through the ability to continuously adjust the projected direction of the well path by sending commands to the downhole drilling hardware. This ability allows a driller to continuously interpret real-time data (e.g., survey data) received from downhole sensors and fine tune the projected well path accordingly. In such applications, reliable and accurate data transmission is important as errors in command interpretation by the downhole drilling hardware may cause considerable difficulties.

Some prior art communication mechanisms require that the drill string stop rotating and/or that the mud motors stop pumping prior to transmitting commands to the downhole tool. Such techniques tend to be disadvantageous since each time the drilling operation is stopped valuable rig time is lost. Moreover, stopping the drill string increases the likelihood that it becomes irretrievably lodged in the borehole. Prior art communication mechanisms that rely on absolute rotation rates of the drill string to encode data are known (including U.S. Pat. No. 5,603,386 to Webster). Such techniques are serviceable, but can be improved upon. For example, the optimum rotation rate of the drill string may vary within an operation, or from one operation to the next, depending on the type of drill bit being used and the strata being penetrated. Such techniques also typically require that the drill string be stopped prior to transmitting data.

Therefore, there exists a need for improved techniques for communicating from the surface to a downhole tool. In particular, there is a need for a technique that does not significantly interrupt the drilling operation and that is typically effective regardless of the preferred drilling rate.

SUMMARY OF THE INVENTION

The present invention addresses one or more of the above-described drawbacks of prior art downhole communication methods. Aspects of this invention include a method for communicating with a downhole tool deployed in a subterranean borehole. The method includes encoding data and/or commands in a code sequence of varying drill string rotation variables. Such rotation rate variations (e.g., first and second rotation rates) are measured downhole and the measured rates processed to decode the data and/or the command. In one serviceable embodiment, commands are transmitted to a downhole steering tool (e.g., a three-dimensional rotary steerable tool). The commands are encoded in a series of rotation rate pulses (an increased rotation rate for a period of time). The rotation rates and durations of the pulses are measured downhole and processed to decode the commands. Such commands may then be executed, for example, to change the direction of drilling the borehole.

Exemplary embodiments of the present invention may advantageously provide several technical advantages. For example, exemplary methods according to this invention provide for quick and accurate communication with a downhole tool, such as a sensor or a downhole drilling tool. Aspects of this invention are particularly advantageous in that the surface to downhole communication may be accomplished without substantially interrupting the drilling process. Rather, data and/or commands may be encoded in rotation rate variations in the drill string and transmitted downhole during drilling. Moreover, aspects of this invention may be utilized in combination with conventional downhole communication techniques. For example, in one embodiment, MWD data may be receive via conventional mud pulse telemetry techniques and utilized in steering decisions. Commands may then be encoded in a sequence of various drill string rotation variables and transmitted downhole to a directional drilling tool.

In certain other advantageous embodiments, the data and/or commands may be encoded based on a plurality of measured parameters. For example, a command may be encoded as a predefined function of both the rotation rate (or the change in rotation rate from some baseline rate) and the duration of some predefined interval of a code sequence. One advantage of using two (or more) parameters is that more data and/or commands may be encoded a given code sequence. Likewise, fewer coding levels are required for each parameter, thereby reducing the likelihood of transmission errors.

In one exemplary aspect the present invention includes a method for communicating with a downhole device deployed in a subterranean borehole. The method includes deploying a downhole device in a subterranean borehole, the device being coupled to a drill string, the drill string being rotatable about a longitudinal axis, the device including a measurement device operative to measure a rotation rate of the drill string about the longitudinal axis. The method further includes predefining an encoding language including codes understandable to the downhole device, the codes being represented in the language as predefined value combinations of drill string rotation variables such as rotation rate. The method further includes causing the drill string to rotate at substantially first and second rotation rates and causing the measurement device to measure the first and second rotation rates. The measured first rotation rate is processed downhole in combination with the measured second rotation rate to acquire at least one code in the language at the downhole device.

In another exemplary aspect the present invention includes a method for encoding a command transmitted from a drilling rig to a downhole steering tool deployed in a subterranean borehole. The method includes deploying the steering tool in the borehole. The steering tool is coupled to a drill string, and the drill string is rotatable about a longitudinal axis thereof. The steering tool further includes a measurement device operative to measure a rotation rate of the drill string about the longitudinal axis. The method further includes predefining an encoding language comprising commands understandable to the steering tool. The commands are operative, when received by the steering tool, to trigger a predetermined response in the steering tool. The commands are represented in said language and understandable by the steering tool as predefined value combinations of drill string rotation variables such as rotation rate and duration. The method further includes establishing a base rotation rate by causing the drill string to rotate within a predefined range of a first predetermined rotation rate for substantially a first predetermined duration. The method further includes causing the drill string to rotate through a predefined sequence of value combinations of drill string rotation variables, the predefined sequence including value combinations of drill string rotation variables understandable by the steering tool as commands.

The foregoing has outlined rather broadly the features of the present invention in order that the detailed description of the invention that follows may be better understood. Additional features and advantages of the invention will be described hereinafter which form the subject of the claims of the invention. It should be appreciated by those skilled in the art that the conception and the specific embodiments disclosed may be readily utilized as a basis for modifying or designing other methods, structures, and encoding schemes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIGS. 5A through 5E depict, in combination, a flow diagram illustrating one exemplary method embodiment in accordance with the present invention.

DETAILED DESCRIPTION

Figure 1:
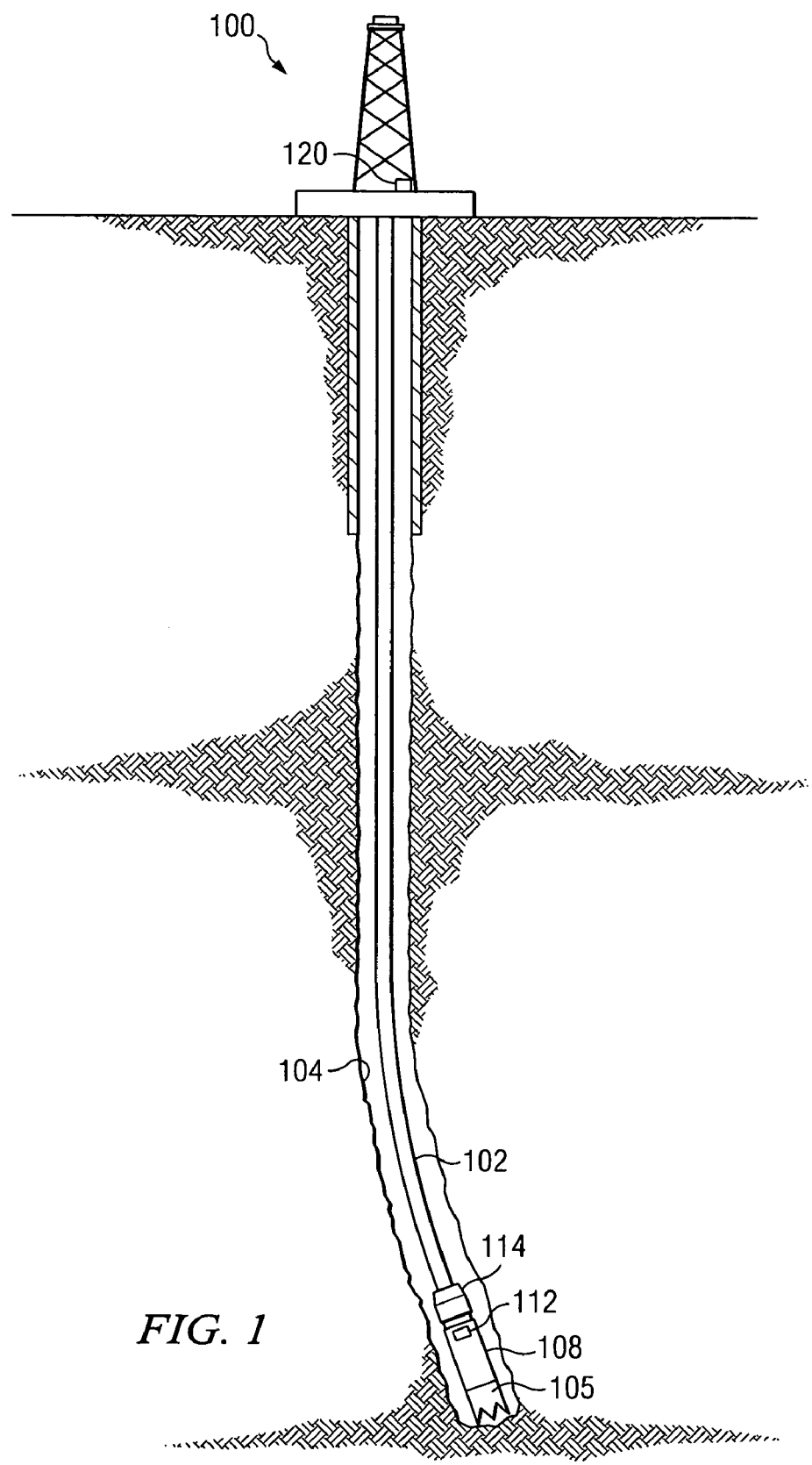
FIG. 1 depicts an exemplary drilling rig in accordance with the present invention on which an exemplary embodiment of the present invention has been deployed.

FIG. 1 depicts a diagram representing an exemplary drilling rig 100 on which the methods and apparatus of the present invention may be deployed. Drill string 102 comprises a plurality of sections of elongated drill pipe and is shown within a borehole 104. The distal end of the drill string 102 includes a drill bit 105 for drilling the borehole 104. Drill string 102 further comprises a downhole device 108 that is adapted to receive data transmitted from the surface, the data encoded as a sequence of rotation rate variations of the drill string 102 in accordance with the present invention. As described in more detail below with respect to FIGS. 2A and 2B, downhole device 108 includes a sensor for measuring the rotation rate of the drill string 102. Downhole device 108 may further optionally include a trajectory control mechanism that is responsive to commands transmitted from the surface to direct the projected path of the borehole 104 during drilling. Downhole device 108 may also include other optional sensors 112 capable of determining, for example, the location, depth, and orientation of the downhole device 108 in the borehole 104. The drill string 102 may optionally include other sensors 114 as well, for example, for measuring various formation and borehole 104 properties. Although not illustrated on FIG. 1, the drill string may further optionally include another downhole communication system (such as a mud pulse telemetry system), e.g., for transmitting acquired data to the surface.

With continued reference to FIG. 1, a rotation speed controller 120, located at the surface, is adjustable to control the rotation rate of the drill string 102. The rotation speed controller 120 provides for rotation-encoded data to be transmitted from the surface to downhole device 108. Data, in accordance with the present invention, is encoded as a sequence of variations in rotation rate of the drill string 102. The rotation speed controller 120 may be under the control of a computer or alternatively it may be manually adjustable. In such manual embodiments, the rotation speed controller 120 may, for example, include a knob, such as a variable controlled potentiometer, that is operable by an operator to control the rotation rate of the drill string 102. An operator may consult a stopwatch and by dynamically adjusting the knob, encode and transmit rotation-encoded data in a time efficient manner and in accordance with the present invention. In some situations, if the drill string 102 is rotating at or near the maximum rotation rate, it may be necessary to slow the rotation rate prior to transmitting rotation-encoded data.

It will be appreciated that the drill string 102 provides the physical medium for communicating information from the surface to the downhole device 108. As described in more detail below, the rotation rate of the drill string 102 and changes thereto have been found to be a reliable carrier of information from the surface to downhole. Although changes in the rotation rate may take considerable time to traverse thousands of feet of drill pipe, the relative duration of the pulses or frames comprising each data encoded sequence of varying rotation rates are typically reliably preserved. For example, the rotation rate of the drill string at the surface has been found to generally result in a comparable rotation rate downhole. Moreover, a sequence of varying rotation rates has been found to ripple through the drill string with sufficient accuracy to generally allow both the rotation rate as well as the relative time relationships within the sequence to be utilized to reliably encode data and/or commands. Encoding schemes based on both the rotation rate and the relative time relationships within a sequence of rotation rate variations advantageously permit short sequences for encoding a wide array of data options.

With continued reference to FIG. 1, aspects of the present invention are particularly well suited to (although expressly not limited to) applications in which the downhole device 108 receiving information from the surface is a directional drilling tool. Directional drilling tools commonly require substantially real-time adjustment to properly control the trajectory of the borehole. One advantage of certain aspects of this invention is that the surface to downhole communication may be accomplished without interrupting the drilling process. Additionally, the optimal rotation rate of a drill string 102 typically varies from one operation to the next due to variations in the strata being drilled and to changes in the type of drill bit being used. The present invention may advantageously be utilized at substantially any conventional rotation rate being employed to drill the borehole 104. Moreover, aspects of this invention enable quick and accurate communication with a downhole device 108. This is particularly advantageous when communicating with a directional drilling tool, such as a three-dimensional rotary steerable tool, since errors in directional commands may result in drilling a borehole in the wrong direction.

It will also be appreciated that this invention may also be advantageously utilized in non-directional drilling applications. For example, with further reference to FIG. 1, aspects of this invention may be utilized to transmit commands from the surface to activate or deactivate a sensor 114. Additionally, certain aspects of this invention may be utilized in combination with other techniques (such as mud pulse telemetry) of transmitting data from downhole sensors 112 and 114 to the surface. Such a combination of techniques may provide enhanced functionality, such as in directional drilling applications in which data from various downhole sensors 112 and 114 may be analyzed at the surface and used to adjust the desired trajectory of the borehole 104.

Figure 2A:
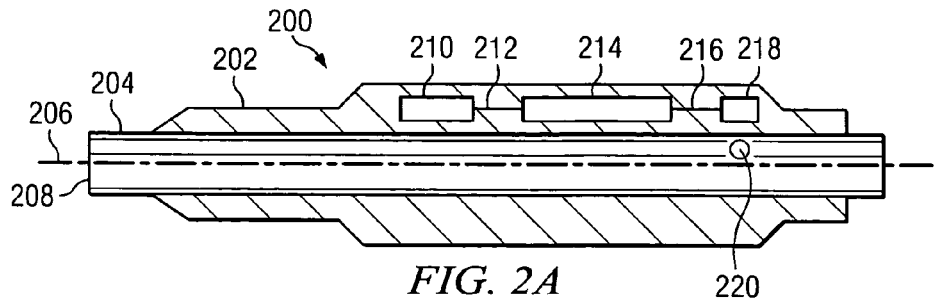
FIG. 2A depicts a schematic illustration of one exemplary embodiment of a downhole tool in accordance with the present invention.

With reference now to FIG. 2A, and continued reference to FIG. 1, one embodiment of a directional drilling tool 200 is schematically illustrated. Tool 200 includes a substantially non-rotating housing 202, which, in this exemplary embodiment, is adapted to selectively activate blades or stabilizers (not shown) that bear against the sides of the borehole 104 so as to prevent the housing 202 from rotating as the drill string 102 rotates. The blades or stabilizers may also be extendable to control the direction of drilling by deflecting portions of drill string 102 off center relative to the longitudinal center (axis) of the borehole 104. A drive shaft 204 is rotatable within the housing 202 about the longitudinal axis 206 of tool 200. One end 208 of the drive shaft 204 is typically coupled to the drill string 102 and rotates therewith.

Tool 200 includes a rotation sensor 218 for tracking the rotations of the drive shaft 204. In the embodiment shown on FIG. 2, the drive shaft 204 includes a marker 220. The rotation sensor 218, located in the non-rotating housing 202 in this embodiment, detects each time the marker 220 passes near the rotation sensor 218 as the drive shaft 204 rotates. A receiver system 214 is communicatively coupled to rotation sensor 218 through path 216. Receiver system 214 selectively measures the rotation rate of the drive shaft 204 to receive rotation-encoded data from the surface. The receiver system 214 is responsive to data transmitted from the surface to direct the control unit 210 via path 212. It will be appreciated that multiple markers 220 may optionally be deployed, which may, for example, be located equidistantly around the drive shaft 204 to increase the resolution (and thus precision of recognition) of the rotation measurements.

Mechanisms and techniques for embodying rotation sensor 218 and marker 220 are well known in the art. Alternative embodiments may locate the rotation sensor 218 on the drive shaft 204 and locate the marker 218 on the non-rotating housing 202. Marker 202 may, for example, include a magnet and the rotation sensor 218 may include a Hall effect sensor. Alternatively, the rotation sensor 218 may include an infra-red sensor configured to sense a marker 220 including, for example, a mirror reflecting light from a source located near the sensor 218. An ultrasonic sensor may also be employed with a suitable marker 220. Additionally, it will be appreciated that this invention may be employed in a downhole tool that does not include a substantially non-rotatable housing. In such an embodiment, a device that senses changes in centrifugal force may be used to determine the rotation rate of the drill string 102 (FIG. 1). Alternatively, a terrestrial reference, such as gravity or the Earth's magnetic field, may be employed as a reference to measure the rotation rate of the drill string 102. Other well-known and suitable devices for measuring the rotation rate of the drill string 102 include, for example, an accelerometer package, a tri-axial magnetometer, and a gyroscopic sensor.

Figure 2B:
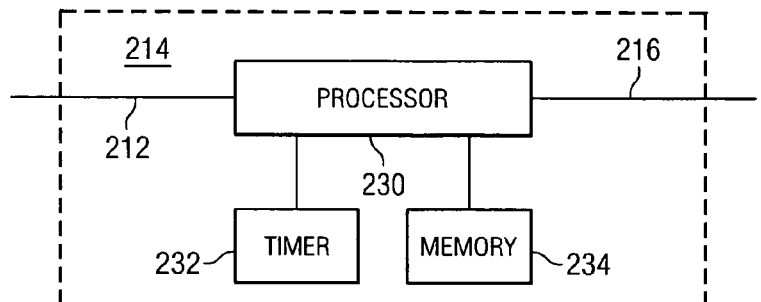
FIG. 2B is a block diagram of an exemplary embodiment of a receiver system in accordance with the present invention.

With reference now to FIG. 2B a block diagram of one exemplary embodiment of the receiver system 214 shown on FIG. 2A is illustrated. Receiver system 214 includes a processor 230 communicatively coupled, as shown on FIG. 2A, through path 212 to control unit 210. Receiver system 214 further includes a memory device 234 coupled to processor 230, in which programs and data may be stored and retrieved. Processor 230 is also coupled to timer device 232 for tracking time such as, for example, an incrementing counter, a decrementing time-out counter, or a real-time clock. In one exemplary embodiment, the processor 230 receives a pulse via path 216 each time the sensor 218 on FIG. 2A detects the marker 220. Processor 230 may selectively measure the rotation rate of the drive shaft 204 by counting the pulses and consulting the timer 232. Alternatively, the processor may determine a rotation rate based on a time interval between sequential pulses. One skilled in the art will recognize that the functions performed by the various components of exemplary receiver system 214 may be distributed among a number of different devices other than as shown. Alternatively, multiple functions performed by the components shown in FIG. 2B may be integrated into a single physical device.

Figure 3:
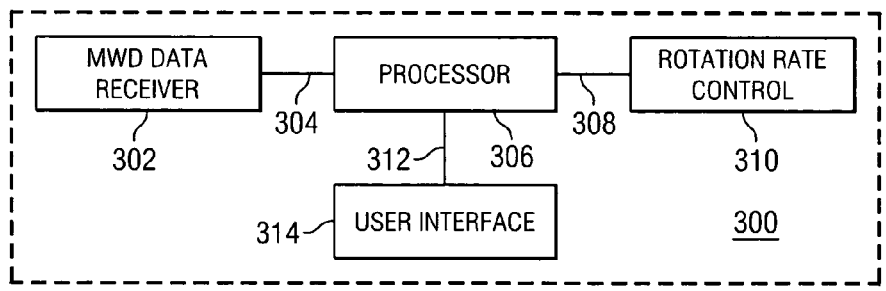
FIG. 3 is a block diagram of an exemplary embodiment of a transmission system in accordance with the present invention.

Turning now to FIG. 3, a block diagram of a transmission system 300 suitable for rotation speed controller 120 (FIG. 1) is illustrated. As described above with respect to FIG. 1, the rotation speed controller 120 may include, for example, a knob for manually setting the rotation rate of the drill string 102. Rotation-encoded data, in accordance with this invention, may be simply and efficiently transmitted by manually adjusting the knob. Alternatively, with reference to FIG. 3, aspects of this invention may include a transmission system 300 to translate commands from an operator into rotation-encoded data and to transmit the commands to the downhole tool. An exemplary transmission system 300 may include a rotation rate controller 310 that is under the control of a processor 306 via path 308. A user interface 314 is communicatively coupled to processor 306 via path 312 to receive the commands from an operator. The user interface 314 may include, for example, a keyboard and a monitor. Processor 306 and user interface 314 may be implemented, for example, with a personal computer. Optionally, a remote communications mechanism (not shown), such as a phone line, communications network, or the Internet, may be included between the rotation rate controller 310 and the user interface 314. Control of the rotation rate by processor 306 often advantageously allows for tighter tolerance requirements for the rotation-encoded data to be recognized and communicated. This higher resolution may allow for greater amounts of data to be transmitted, as well as a greater range of data options than may be practically available using manual operated rotation speed control.

Exemplary commands from the operator may include steering commands in the form of directional vectors, a desired trajectory, or a set of triggers or parameters for determining the desired trajectory of a directional drilling tool. Referring now also to FIG. 1, processor 306 may also be communicatively coupled to an optional MWD data receiver system 302 via path 304 for receiving MWD data acquired by the one or more downhole sensors 112 and 114 (e.g., via mud pulse telemetry). MWD data may include, for example, the location and orientation of the downhole device 108 and/or information concerning the borehole 104 and surrounding formation. In addition, processor 306 may be programmed to interpret certain aspects of the MWD data and automatically respond to specified triggers or programmed parameters to send rotation-encoded data to the downhole device 108 that make directional adjustments in accordance with the program and MWD data.

Reference should now be made to FIGS. 4A through 4D. Certain exemplary encoding schemes, consistent with the present invention, encode data as a predefined sequence of varying rotation rates of a drill string. Such a sequence is referred to herein as a "code sequence." The encoding scheme may define one or more codes as a function of one or more measurable parameters of a code sequence, such as the rotation rates at predefined times in the code sequence as well as the duration of predefined portions of the code sequence. In certain advantageous embodiments, various codes may be predefined as a function of both duration of a predefined portion of each code sequence and rotation rate (or the change in rotation rate from some baseline rate) measured during a predefined interval in each code sequence. One advantage of using two parameters (such as duration and rotation rate) is that a lower number of unique levels (or ranges) are required for each parameter. For example, only four levels are required for each parameter to provide the sixteen unique combinations needed to relate one unique code combination to each of the sixteen hexadecimal data options. It is also often advantageous (although not required) to encode one or more validation checks in predefined portions of a code sequence to decrease the likelihood of random fluctuations in rotation being erroneously interpreted as encoded data. For example, a particular encoding scheme may specify that to be recognized as a code sequence the initial portions (e.g. preamble) of each code sequence to be within a predefined range of rotation and/or have relative time relationships that conform to predefined criteria.

Additionally, rather than encoding numbers (such as hexadecimal data), encoded data may be in the form of commands. For example, a plurality of unique commands may each be associated with a specific action, instruction, programming function, or may have other meaning to a particular downhole device. In one exemplary embodiment, a plurality of command options is provided, each of which typically requires a response by the downhole device. Each command option includes one or more parameters of the command that further specify each action. One or more codes may be predefined as a function of selected measurable parameters of each code sequence, such as duration and/or rotation rate. For example, a first code may be defined as a function of the rotation rate measured during a particular portion in each code sequence and a second code may be defined as a function of the rotation rate measured during another particular portion in each code sequence. A plurality of unique combinations of the first and second codes may relate to a plurality of unique combinations of command and parameter options. Each unique value for the first code may represent one of the command options and each unique value for the second code may represent one of the parameter options associated with the selected command. One skilled in the art will recognize that codes may be related to numbers that are also related to commands and that a code sequence may encode both numbers and commands or be assigned any other data element that has meaning to the downhole device.

Various alternative exemplary embodiments of encoding schemes, in accordance with the present invention, are described, in conjunction with FIGS. 4A through 4D. FIGS. 4A through 4D show waveforms 400, 430, 450, and 480, each of which represents on exemplary embodiment of rotation-encoded data. The vertical scale indicates the rotation rate of the drill string measured in rotations per minute (RPM). The horizontal scale indicates relative time in seconds measured from an arbitrary reference.

One aspect of each of the exemplary encoding schemes described in conjunction with FIGS. 4A through 4D is the establishment of a base rotation rate. However, certain embodiments of the present invention do not depend on the establishment of a base rotation rate. The use of a base rotation rate offers the advantage of encoding schemes that provide for data to be transmitted from the rig to downhole without significant interruption of the drilling operation. Such encoding schemes are generally effective regardless of the rotation rate employed by a particular drilling operation. A base rotation rate is established when the rotation rate of the drill string maintains an essentially constant level, within a predefined tolerance range, for a predefined amount of time. In addition, after a base rotation rate is established, it may be invalidated whenever the rotation sequence is detected to be inconsistent with the employed encoding scheme. For example, a decoder may detect the conditions for establishing a base rotation rate and then detect a divergence from the base rotation rate. The decoder then determines whether the divergence is part of a valid code sequence. If the divergence is not consistent with a predefined code sequence, then the decoder will invalidate the base rotation rate and return to a state where it waits for a base rotation rate to be established.

For example, in the exemplary embodiments shown on FIGS. 4A through 4D, the base rotation rate, 403, 431 451, 481, is established when the rotation rate remains at a constant level for 90 seconds or longer, without increasing or decreasing by more than 10 RPM. An exemplary decoding scheme, e.g., as executed by downhole receiver system 214 on FIG. 2B, may track the rotation rate of the drill string, and when a code sequence is not being received, it may enter a state where it waits for the base rotation rate to be established. The interval of time indicated by reference 402 (FIG. 4A) shows that the rotation rate of the drill string is about 120 RPM for greater then 90 seconds. As such, each of the disclosed exemplary encoding schemes (as shown on FIGS. 4A through 4D) has an established base rotation rate of 120 RPM.

Figure 4A:
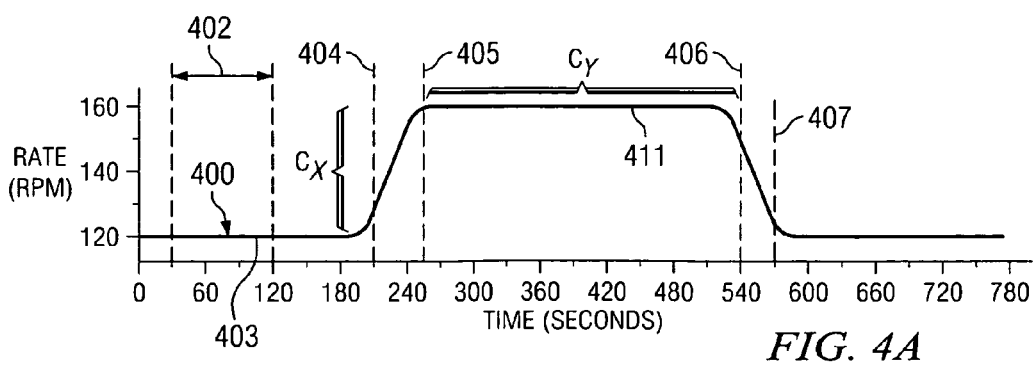
FIGS. 4A through 4D depict exemplary waveforms representing code sequences in accordance with the present invention.

With reference now to FIG. 4A, one exemplary embodiment of rotation-encoded data is represented by waveform 400, which is in the form of a pulse. A pulse, in this exemplary embodiment, is predefined as a transitory divergence from a base rotation rate 403. During a portion of each transitory divergence, the pulse is required to remain at a constant rotation rate, within a predefined tolerance range. In the particular encoding scheme illustrated, a pulse is defined as an increase in the rotation rate from the base level 403 to faster rotation rate referred to as the elevated level 411, for a specified amount of time, followed by a return to the base level 403. Alternative embodiments may define a pulse as a decrease in the rotation rate to a reduced level, for a specified amount of time, followed by a return to the base level 403. In the embodiment shown, the pulse provides two parameters for encoding data: duration and rotation rate. Waveform 400 on FIG. 4A illustrates a first code $C_Y$ that is defined as a function of the measured duration and a second code $C_X$ that is defined as a function of the difference between the rotation rate at the elevated level and the base level. Alternative embodiments may define a single code or possibly more than two codes as a function of the measured duration and the rotation rate difference of the elevated or reduced level. Alternative embodiments may also define one or more codes as a function of duration and absolute value of rotation rate, rather than the rotation rate measured relative to a base rotation rate.

With continued reference to FIG. 4A, one exemplary embodiment may require the rotation rate to reach the elevated level 411 within 40 seconds (point in time indicated by reference 405) after the point in time 404 at which the rotation rate is detected to increase by more than 10 RPM above the base level 403. The elevated level 411 may, for example, be required to be at least 20 RPM or more above the base level 403. For the duration of the pulse, the rotation rate may be required to remain essentially at the elevated level 411 without, for example, increasing by more than 10 RPM above the elevated level 411 or decreasing by than 10 RPM below the elevated level 411. The end of the interval for measuring duration may be defined to occur at the point in time 406, when the rotation rate is detected to decrease by more than 10 RPM from the elevated level 411. In accordance with this particular scheme, the duration of pulse shown in FIG. 4A is approximately 290 seconds.

It will be appreciated that the interval of time measured for determining the duration of a pulse may vary from one embodiment of an encoding scheme to another. A particular scheme may delineate the interval for measuring the duration of a pulse in any one of a variety of ways that provide for a consistent manner of encoding and decoding rotational-encoded data. Factors that may be considered in defining the beginning and end of a pulse include the resolution of the rotation rate measurements, the range of valid rotation rates, the amount of time required to obtain an accurate rotation rate measurement, the accuracy of the encoding mechanism, the changes in duration in a particular sequence due to the propagation through the drill string, the ease of encoding or decoding, and the required accuracy of the decoding mechanism.

Exemplary embodiments may, for example, predefine the interval for measuring the duration to be delineated by the point in time 404 in which the rotation rate increases more than 10 RPM above base 403 and the point in time 407 in which the rotation rate drops to a level within 10 RPM of base 403. In such embodiments, the duration of pulse shown in FIG. 4A would be approximately 360 seconds. Another encoding scheme may, for example, predefine the interval for measuring the duration may be delineated by the point in time 405 in which the rotation rate reaches the elevated level 411 and the point in time 406 in which the rotation rate is detected to drop 10 RPM from the elevated level 411. In such embodiments, the duration of pulse shown in FIG. 4A, for determining code $C_Y$, would be approximately 290 seconds.

Figure 4B:
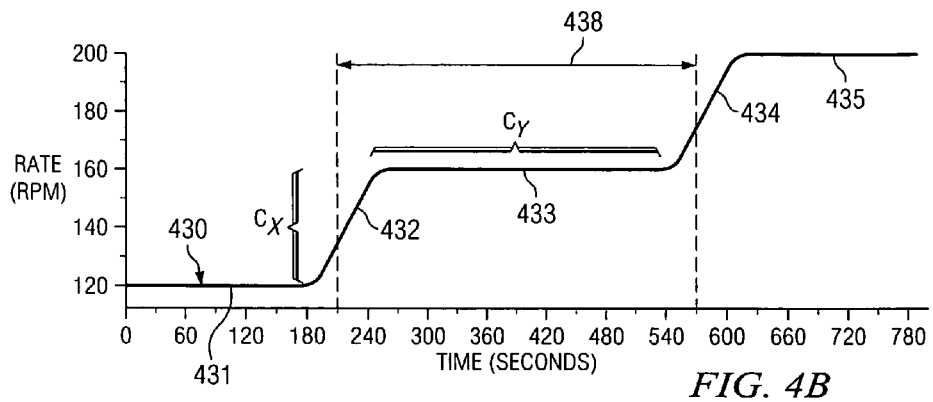

With reference now to FIG. 4B, another exemplary waveform 430 is illustrated. A pulse, having a duration $C_Y$ in accordance with this particular embodiment, is predefined as a first transition 432 from the base rotation rate 431 to a first constant level 433 followed by a second transition 434 to a second constant level 435. In this encoding scheme, the duration $C_Y$ is defined as the interval of time in which the rotation rate stays (within a defined tolerance range) at the first constant level. However, this particular encoding scheme may increase the likelihood of random variations in the rotation rate being erroneously interpreted as encoded data.

Figure 4C:
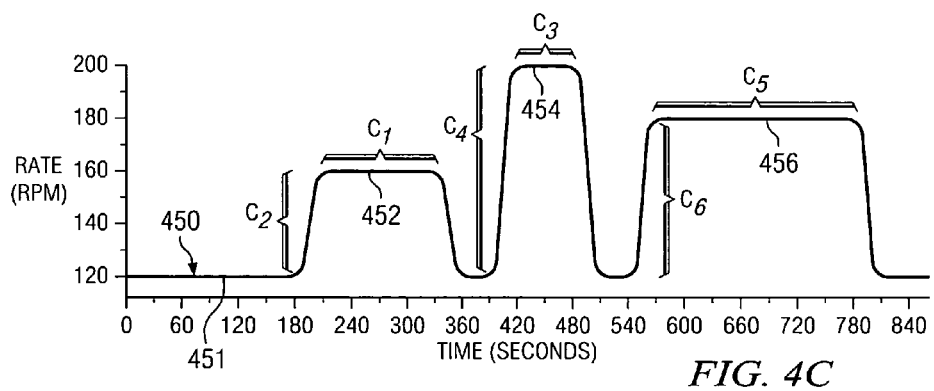

FIG. 4C shows a waveform 450 of an exemplary code sequence comprising three consecutive pulses that provide 6 codes $C_1$ through $C_6$. Code elements $C_1$, $C_3$, $C_5$ are defined respectively as a function of duration of the first, second and third pulses. Code elements $C_2$, $C_4$, $C_6$ are defined respectively as a function of the rotation rate 452, 454, 456 of the first, second, and third pulses and, optionally, the base rotation rate 451. In the particular embodiment shown in FIG. 4C, code elements $C_2$, $C_4$, $C_6$ are defined as the difference between the rotation rate of the respective pulse 452, 454, 456 and the base rotation rate 451. With reference to the exemplary waveform 450 of FIG. 4C, the base rotation rate 451 is approximately 120 RPM and the value of the codes are roughly as follows: $C_1$ is 145 seconds, $C_2$ is 40 RPM, $C_3$ is 90 seconds, $C_4$ is 80 RPM, $C_5$ is 225 seconds, and $C_6$ is 60 RPM. To decrease the likelihood of erroneously interpreting random fluctuations in RPM as an encoded command, a particular encoding scheme may require the rotation rate of the first pulse $C_1$ to be within a predefined range, thereby acting as a validation pulse and thus not utilized to encode data.

Figure 4D:
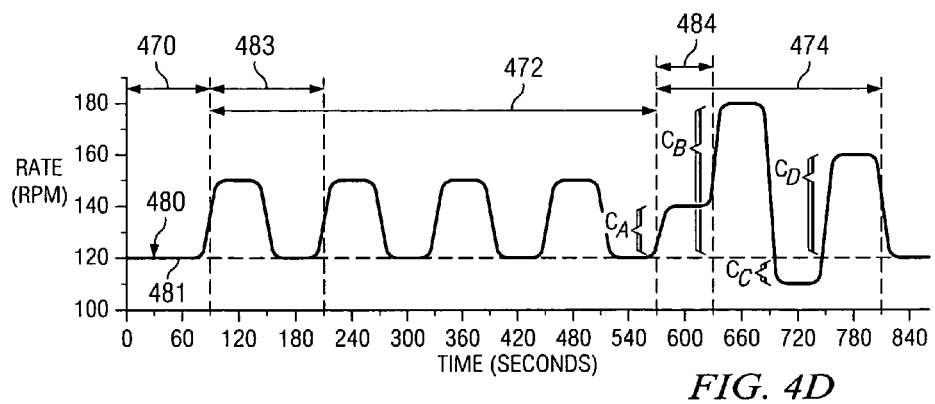

Referring now to FIG. 4D, alternative embodiments of an encoding scheme of the present invention may define code sequences as consecutive periods of time in which the downhole receiver 214 (FIG. 2A) samples the rotation rate. Each code sequence may include a predefined preamble comprising a sequence of varying rotation rates that is unlikely to occur randomly followed by the rotation-encoded data. Optionally, embodiments may provide for the preamble to synchronize the downhole receiver system 214 (FIG. 2A).

Waveform 480 shown in FIG. 4D is an example of a valid code sequence of an exemplary encoding scheme. As shown in FIG. 4D, the code sequence comprises three time intervals 470, 472, 474. During the first time interval 470, the base rotation rate 481 is established. The next time interval in exemplary waveform 480 is the preamble portion 472, which is followed immediately by the data portion 474. The preamble 472, in the example of FIG. 4D, is defined as a sequence of four pulses. Each pulse in the preamble 472 is required to have a transitory divergence in the range of 50 to 70 RPM above the base rotation rate 481. The duration of the divergence is required to exceed 40 seconds and the waveform is required to return to base level RPM (within a defined tolerance range) for at least 10 second between consecutive pulses. The preamble 472, in this particular embodiment, is received by the downhole receiver system 214, to verify the code sequence is valid, to determine the sampling rate of the data portion 474 of the code sequence, and to synchronize the receiver system to the incoming code sequence.

With continued reference to FIG. 4D, the data portion 474 of exemplary waveform 480 includes four periods 484 for defining four codes $C_A$ through $C_D$, that are defined as a function of rotation rate and, optionally, the established base rotation rate 481. To determine the sampling rate of the data portion 474 of a code sequence, a receiver system 214 (e.g., as shown on FIG. 2A) advantageously measures the period 483 between consecutive pulses of the preamble 472 on FIG. 4D. The sampling rate, or period 484, of the data portion 474 of the code sequence is defined in this particular exemplary encoding scheme to be one half that of the period 483 of the preamble. In order to measure the rotation rate for determining codes $C_A$ through $C_D$, each code sequence is sampled during a preselected interval, for example 4 seconds, that falls approximately in the middle of each period 484 of the data portion 474 of the code sequence. Waveform 480 has a period 483 between consecutive preamble pulses of about 120 seconds, thereby establishing a sampling rate of 60 seconds for the data portion 474. The base rotation rate 481 is about 120 RPM and, roughly, $C_A$ is 20 RPM, $C_B$ is 60 RPM, $C_C$ is −10 RPM, $C_D$ is 40 RPM. It will be appreciated that the first code $C_A$ may optionally indicate the number of codes in the data portion 474 that follows.

In embodiments in which the rotation rate of the drill string is controlled at the surface by manual operation, it is typically advantageous to use rotational encoding schemes that utilize a sequence of pulses with the codes defined as a function of the duration of pulses as well as the rotation rate. Such encoding schemes tend to be tolerant to errors in the encoding while providing for efficient transmission. On the other hand, in embodiments in which the rotation rate on the surface is under computer control, it may be advantageous to transmit data encoded by a rotation rate that is sampled by the downhole receiver following the establishment of predefined periods. This is particularly effective in embodiments in which the rotation rate can be controlled reasonably accurately and in which large amounts of data are transmitted.

An exemplary encoding scheme of the present invention provides an operator with, for example, control of a directional drilling downhole tool similar to tool 200 described in conjunction with FIG. 2A. In such an exemplary embodiment, commands from the surface are received by the directional drilling tool 200 to determine the projected trajectory of an Earth bore as the bore is being drilled. Directional commands from the surface are in the form of a desired tool face and offset for the drilling tool 200. In addition to directional commands, another command is provided that causes the blade(s) of the directional drilling tool 200 to collapse to allow the tool to be retrieved from the borehole. With regard to directional commands, tool face and offset describe the orientation of the tool 200 relative to the center of the borehole. Offset specifies the distance between the longitudinal axis 206 of the tool on FIG. 2A and the longitudinal axis of the borehole. Tool face is the desired directional drilling angle relative to a reference and can range from 0° to 360° degrees. Zero degrees is generally, although not necessarily, defined as the high most point of a theoretical plane traversing the borehole. In the unlikely situation in which the drill hole is exactly vertical, zero degrees may be chosen arbitrarily, but will change as soon as the drill deviates from vertical.

An exemplary encoding scheme of the present invention utilizes Tables 1 through 6 to relate a unique combination of codes to each of a plurality of commands that indicate specific actions for a downhole drilling tool (such as tool 200 on FIG. 2A). The codes are embedded in code sequences of rotation rate variations of a drill string. Each code sequence comprises either two or three consecutive pulses. The first pulse in each code sequence selects one of six command types. The subsequent one or two pulses specify particular parameters of the selected command type. Codes are defined as a function of duration and rotation rate measurements for each of the pulses to provide a plurality of unique combinations of code values that represent each of the unique command type/parameter options. As described above with respect to FIG. 4C, code sequences comprising three pluses may be defined to provide 6 codes: codes $C_1$, $C_3$ and $C_5$ on FIG. 4C, which are respectively defined as the duration of the first, second and third pulse of a code sequence and are measured in seconds, and codes $C_2$, $C_4$, and $C_6$ on FIG. 4C, which are measured in RPM and are respectively defined as the difference between the rotation rate of the first, second, and third pulses and the base rotation rate.

TABLE 1

Command Type

| $C_1$ = duration of first pulse (seconds) | Command Type |
|---|---|
| $C_1 < 30$ | Invalid code sequence |
| $30 \leq C_1 < 60$ | Type 1, Specify a desired offset and tool face |
| $60 \leq C_1 < 90$ | Type 2, Specify a desired offset and tool face |
| $90 \leq C_1 < 120$ | Type 3, Specify a desired tool face |
| $120 \leq C_1 < 150$ | Type 4, Specify a desired tool face |
| $150 \leq C_1 < 180$ | Type 5, Specify a desired tool offset |
| $180 \leq C_1 < 210$ | Type 6, Collapse blades |
| $210 \leq C_1$ | Invalid code sequence |

TABLE 2

All Command types, Code Sequence Verification

| $C_2$ = rotation rate of first pulse, relative to base (RPM) | Command |
|---|---|
| $C_2 < 60$ | Invalid code sequence |
| $60 \leq C_2 < 80$ | Valid code sequence |
| $80 < C_2$ | Invalid code sequence |

Tables 1 and 2 above relate a first pulse to one of six command types via first and second codes $C_1$ and $C_2$. As shown in Table 1, command types 1 and 2 specify a desired tool face and a desired offset. As described above, offset specifies the distance between the longitudinal axis of the tool and the longitudinal axis of the borehole. Tool face defines the angular direction of the offset relative to a reference (such as the high side) and may range from 0° to 350° degrees in this exemplary embodiment. Command types 3 and 4 specify only a desired tool face. Command type 5 specifies only the offset. Command type 6 is the "collapse blade" command. As shown in Table 2, code $C_1$ is verified by code $C_2$. In this exemplary embodiment, the first pulse is required to have a rotation rate in the range of 60 to 80 RPM. Otherwise, the code sequence is invalid. As described in more detail below, code sequences for encoding type 1 and 2 commands are predefined to require 3 pulses, including codes $C_1$ through $C_6$, while code sequences for encoding type 3, 4, 5, and 6 commands are predefined to require 2 pulses, including codes $C_1$ through $C_4$.

TABLE 3

Code Sequence Verification for Command Type 6

| $C_3$ = duration of second pulse (seconds) | Command |
|---|---|
| $C_3 < 150$ | Invalid code sequence |
| $150 \leq C_3 < 180$ | Collapse blades |
| $180 \leq C_3$ | Invalid code sequence |

Table 3 above shows a further code verification for the second pulse of command type 6, the "collapse blade" command. In this exemplary embodiment a second pulse having a duration in the range from 150 to 180 seconds is required. Although the command "collapse blades" may be encoded with only a single pulse, two pulses are provided to make it less likely that random fluctuations in drill string speed or operator error are erroneously interpreted as the "collapse blade" command.

TABLE 4

Parameter for Command Types 1 and 3

| $C_3$ = duration of second pulse (seconds) | $C_4$ = rotation rate of second pulse, relative to base (RPM) | Value of tool face (degrees) |
|---|---|---|
| $C_3 < 30$ | X | Invalid code sequence |
| $30 \leq C_3 < 60$ | $20 \leq C_4 < 100$ | $280 + 20 * ((C_4 - 20)/10)$ |
| $60 \leq C_3 < 90$ | $20 \leq C_4 < 100$ | $270 + 20 * ((C_4 - 20)/10)$ |
| $90 \leq C_3$ | $20 \leq C_4 < 100$ | Invalid code sequence |
| X | $100 \leq C_4$ | Invalid code sequence |

TABLE 5

Parameter for Command Types 2 and 4

| $C_3$ = duration of second pulse (seconds) | $C_4$ = rotation rate of second pulse, relative to base (RPM) | Value of tool face (degrees) |
|---|---|---|
| $C_3 < 30$ | X | Invalid code sequence |
| $30 \leq C_3 < 60$ | $20 \leq C_4 < 100$ | $90 + 20 * ((C_4 - 20)/10)$ |
| $60 \leq C_3 < 90$ | $20 \leq C_4 < 100$ | $100 + 20 * ((C_4 - 20)/10)$ |
| $90 \leq C_3$ | $20 \leq C_4 < 100$ | Invalid code sequence |
| X | $100 \leq C_4$ | Invalid code sequence |

Tables 4 and 5 above assign a plurality of tool face options to unique combinations of codes $C_3$ and $C_4$ for command types 1 through 4. In the exemplary embodiment shown, tool face options are available in 10-degree increments ranging from 0 to 350 degrees. Command types 1 and 3 define tool face values ranging from 270 to 80 degrees (270 to 440 degrees), while command types 2 and 4 define tool face values ranging from 90 to 260 degrees. In the embodiment shown, acceptable values of code $C_3$ are either in the range from 30 to 59 seconds or in the range from 60 to 89 seconds. Acceptable values of code $C_4$ are at increments of 10 RPM in the range from 20 to 100 RPM. Tool commands may be advantageously predefined with respect to codes $C_3$ and $C_4$ to substantially minimize errors in programming the directional drilling tool. For example, for a type 1 command, if code $C_3$ has a value of 30 to 59 seconds and code $C_4$ has a value of 40 RPM over the base level, a tool face of 320 degrees is selected. However, an error in code $C_3$ resulting in a value of 60 to 89 seconds results in a tool face of 310 degrees (an error of only 10 degrees). Likewise, an error in code $C_4$ resulting in a value of 50 RPM results in a tool face of 340 degrees (an error of only 20 degrees).

TABLE 6

Parameter for Command Types 3, 4, and 5

| $C_5$ = duration of third pulse {type 3 and 4}; $C_3$ = duration of second pulse {type 5} (seconds) | $C_6$ = rotation rate of third pulse, relative to base {type 3 and 4}; $C_4$ = rotation rate of second pulse, relative to base {type 5} (RPM) | Value of tool offset (inches) |
|---|---|---|
| $C_5, C_3 < 30$ | X | Invalid code sequence |
| $30 \leq C_5, C_3 < 60$ | $20 \leq C_6, C_4 < 100$ | $0.04 * (C_6, C_4 - 20)/10$ |
| $90 \leq C_5, C_3 < 120$ | $20 \leq C_6, C_4 < 100$ | $0.01 + 0.04 * (C_6, C_4 - 20)/10$ |
| $120 \leq C_5, C_3 < 150$ | $20 \leq C_6, C_4 < 100$ | $0.02 + 0.04 * (C_6, C_4 - 20)/10$ |
| $150 \leq C_5, C_3 < 180$ | $20 \leq C_6, C_4 < 100$ | $0.03 + 0.04 * (C_6, C_4 - 20)/10$ |
| $180 \leq C_5, C_3$ | X | Invalid code sequence |
| X | $100 \leq C_6, C_4$ | Invalid code sequence |

Table 6 above assigns a plurality of offset options to unique combinations of codes $C_5$ and $C_6$ for command types 1 and 2 or to unique combinations of codes $C_3$ and $C_4$ for command type 5. Codes $C_5$ and $C_3$ select a base offset option and codes $C_6$ and $C_4$ represent an additional amount that is added to the base offset option to determine the selected tool offset option. Valid rotation rate values for codes $C_6$ and $C_4$ are in the range from 20 to 100 RPM relative to the base level. Each 10-RPM increment above a value of 20 RPM increases the offset by an additional 0.04 inches. For example an offset value of 0.04 inches may be encoded via pulse that has a rotation rate of 30 RPM (over the base level) and a 30 to 59 second duration. It will be appreciated that base offset options selected by codes $C_5$ and $C_3$ are staggered by 0.01 inches to result in negligible programming errors due to small errors in codes $C_5$ and $C_3$, which are defined as a function of duration.

Referring now to FIGS. 5A through 5E a flow diagram of one exemplary method embodiment 500 for decoding rotation encoded data in accordance with the present invention is illustrated. An exemplary receiver system, such as system 214 on FIG. 2A, is suitable to execute exemplary method embodiment 500. In one embodiment, the program is implemented as a state machine that is called once each second to execute a selected portion of the program to determine whether a change in state is in order. Method 500 is suitable to be used to decode code sequences compliant with the encoding scheme described in conjunction with Tables 1 through 6. As described above, the commands are embedded in code sequences comprising either two or three pulses. Such commands are defined as a function of the duration and the rotation rate of the pulse, providing either 4 or 6 codes ($C_1$ through $C_4$ or $C_1$ through $C_6$) in each code sequence, e.g., as shown in FIG. 4C.

Method embodiment 500 utilizes a base rotation rate, which is established for this particular embodiment when the rotation rate of the drill string 102 (FIG. 1) is detected by the receiver system 214 (FIG. 2A) to maintain an essentially constant level, within plus or minus 10 RPM, for 90 seconds. After a base rotation rate is established, it is invalidated whenever the detected rotation sequence is found to be inconsistent with the employed encoding scheme.

Method embodiment 500 defines the rotation rate associated with codes $C_1$, $C_3$, and $C_5$ to be the rotation rate of the drill string for the corresponding first, second and third pulses within a code sequence, as illustrated in FIG. 4C. With reference to FIG. 4A, the rotation rate of a given pulse in this exemplary embodiment is determined at the point in time 405 that occurs 40 seconds after the point in time 404 in which the rotation rate is detected to increase more than 10 RPM from the base level 403.

Likewise, method embodiment 500 defines the durations associated with codes $C_2$, $C_4$, and $C_6$ as the duration of the corresponding first, second, and third pulses within a code sequence, as shown in FIG. 4C. With reference now to FIG. 4A, the start of each pulse in this embodiment is defined to be the point in time 405, which occurs 40 seconds after the point in time 404 in which the rotation rate is detected to increase more than 10 RPM from the base level 403. The end of each pulse is the point in time 406, in which the rotation rate is detected to decreased 10 RPM below the elevated level.

With reference again to the flow diagram of FIGS. 5A through 5E, "STATE", "RATE", "TIMER", and "BASE" refer to variables stored in local memory (e.g., memory 234 on FIG. 2A). Method embodiment 500 functions similarly to a state-machine with STATE indicating the current state. As the code sequence is received and decoded, STATE indicates the current relative position within an incoming code sequence. RATE represents the most recently measured value for the rotation rate of the drive shaft. In this embodiment, RATE is updated once each second by an interrupt driven software routine that computes the average rotation rate for the previous 10 seconds. This interrupt driven routine works in tandem with another interrupt driven routine that is executed (with reference to FIGS. 2A and 2B) each time a sensor 218 detects a marker 220 and accesses a hardware clock-driven timer 232 to determine the amount of time that has passed since the previous instance the marker was detected. TIMER does not refer to the clock-driven timer 232 shown in FIG. 2B, but rather to a variable stored in memory that selectively acts either as an incrementing counter or a decrementing counter. In this embodiment, TIMER is updated once each second by a software subroutine.

Step 501 (on FIG. 5A) is the default step or initial step; in addition, step 501 is entered when an invalid code sequence is detected. At 501 STATE is set to 0 to indicate that no base rotation rate is established and BASE is set to RATE, which is the most recently measured value for the rotation rate of the drill string. When STATE is set to 0, the rotation rate is repeatedly sampled at 502 to determine if a base rotation rate has been established. In this embodiment, a base rotation rate is established when the rotation rate of the drill string is detected to be a approximately constant for 90 seconds at 502 and 506, with no deviation in rotation rate. Upon establishing a base rotation rate, BASE is set to that rate and STATE is set to 1 at 508.

With continued reference to FIG. 5A, RATE is repeatedly sampled (e.g., once per second) at 510 and 512 to determine whether a code sequence is detected as indicated by the start of a pulse. In this particular embodiment, and as shown at 512, a pulse is predefined to start when the rotation rate is detected to increase 10 RPM over the established base rate. As shown at 510, a reduction in rotation rate of more than 10 RPM from the base rate results in the established base rate being invalidated and a return to step 501.

After a pulse is detected, STATE is set to 2 at 514 and after a delay of 40 seconds at 516, code $C_2$ is set to the most recently measured rotation rate of the drill string minus BASE at 517. At 518 codes $C_2$ is compared to a valid range for $C_2$ as provided in Table 2. If code $C_2$ is not within the valid range, the code sequence is invalidated and the program returns to 501. If code $C_2$ is within the valid range, then STATE is set to 3 at 520. Upon setting STATE to 3, TIMER is reset to measure the duration of the first pulse at 522 for determining code $C_1$. The most recently measured rotation rate of the drill string is repeatedly sampled at steps 524, 526, and 528 to determine whether the end of the first pulse is detected, as indicated by a reduction of more than 10 RPM in rotation rate. If the sampled rotation rate is at least 10 RPM greater than that of code $C_2$ plus BASE before the end of the pulse is detected, the code sequence is invalidated as shown at 524. The code sequence is also invalidated at 526 if the duration of the pulse is not within the valid range for code $C_1$ as indicated by TIMER exceeding the upper boundary of 210 seconds prior to the end of the first pulse being detected or at 530 (FIG. 5B) if after the end of the pulse is detected, the duration of the first pulse is not at least 30 seconds. Otherwise, (referring now to FIG. 5B) if the code sequence is not invalidated and the end of the first pulse is detected, then code $C_1$ is set to the current value of TIMER and the command type is selected according to Table 1 above at 532. STATE is then set to 4 at 534.

Figure 5B:
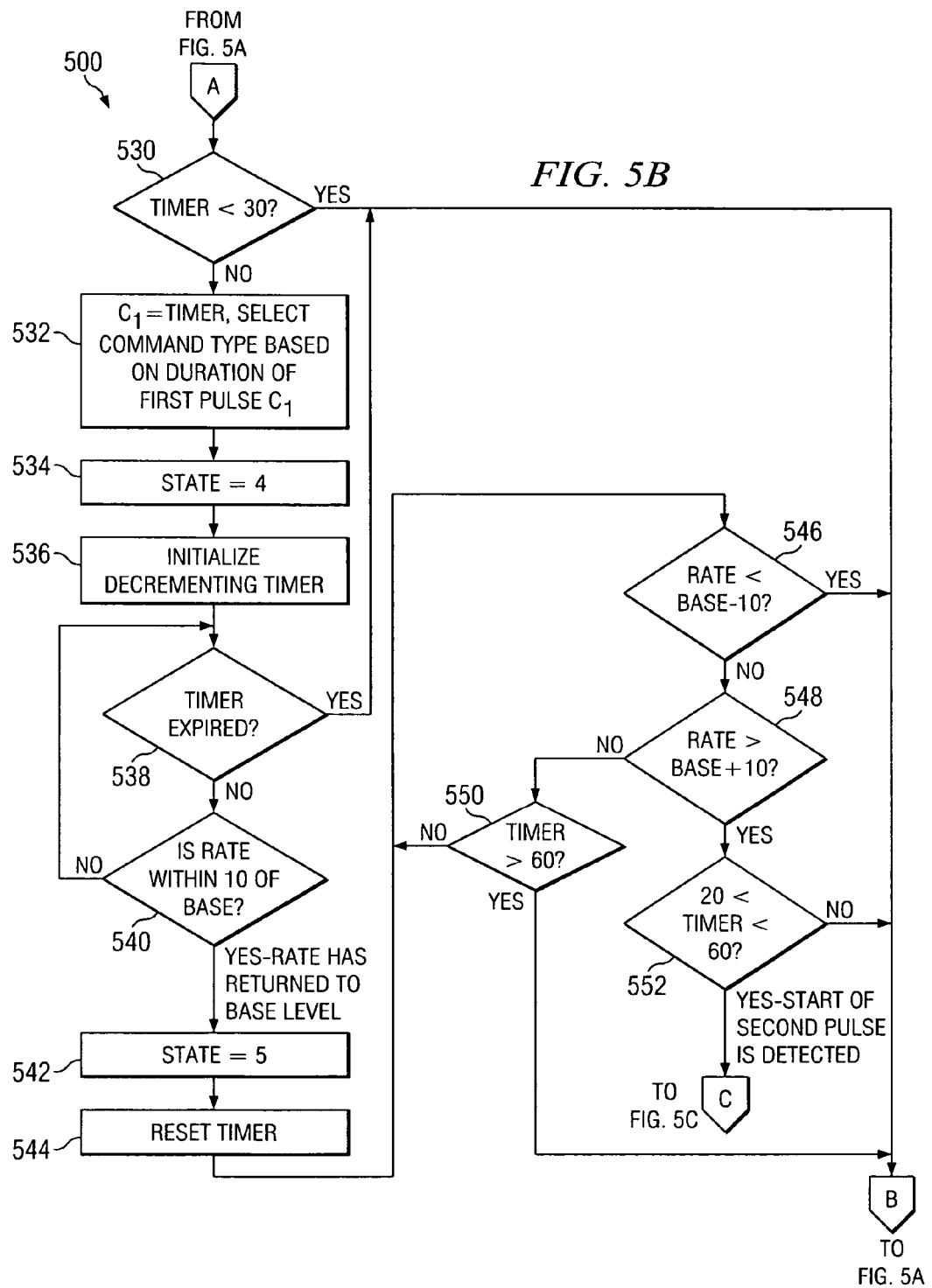

With continued reference to FIG. 5B, upon setting STATE to 4, TIMER is reset at 536 and the rotation rate is repeatedly sampled at 538 and 540 to detect a return to within 10 RPM of BASE within 45 seconds. If the rate does not return to BASE within 45 seconds, then the code sequence is invalidated at 538. Otherwise, STATE is set to 5 at 542 and TIMER is reset at 544. The rotation rate is then repeatedly sampled at 546, 548, and 550 to verify that the rotation rate of the drill string stays within 10 RPM of BASE for at least 20 seconds and that a second pulse is detected at 552 within 60 seconds. Otherwise the code sequence is invalidated. The second pulse is detected at 548 when the rotation rate exceeds BASE by more than 10 RPM.

Figure 5C:
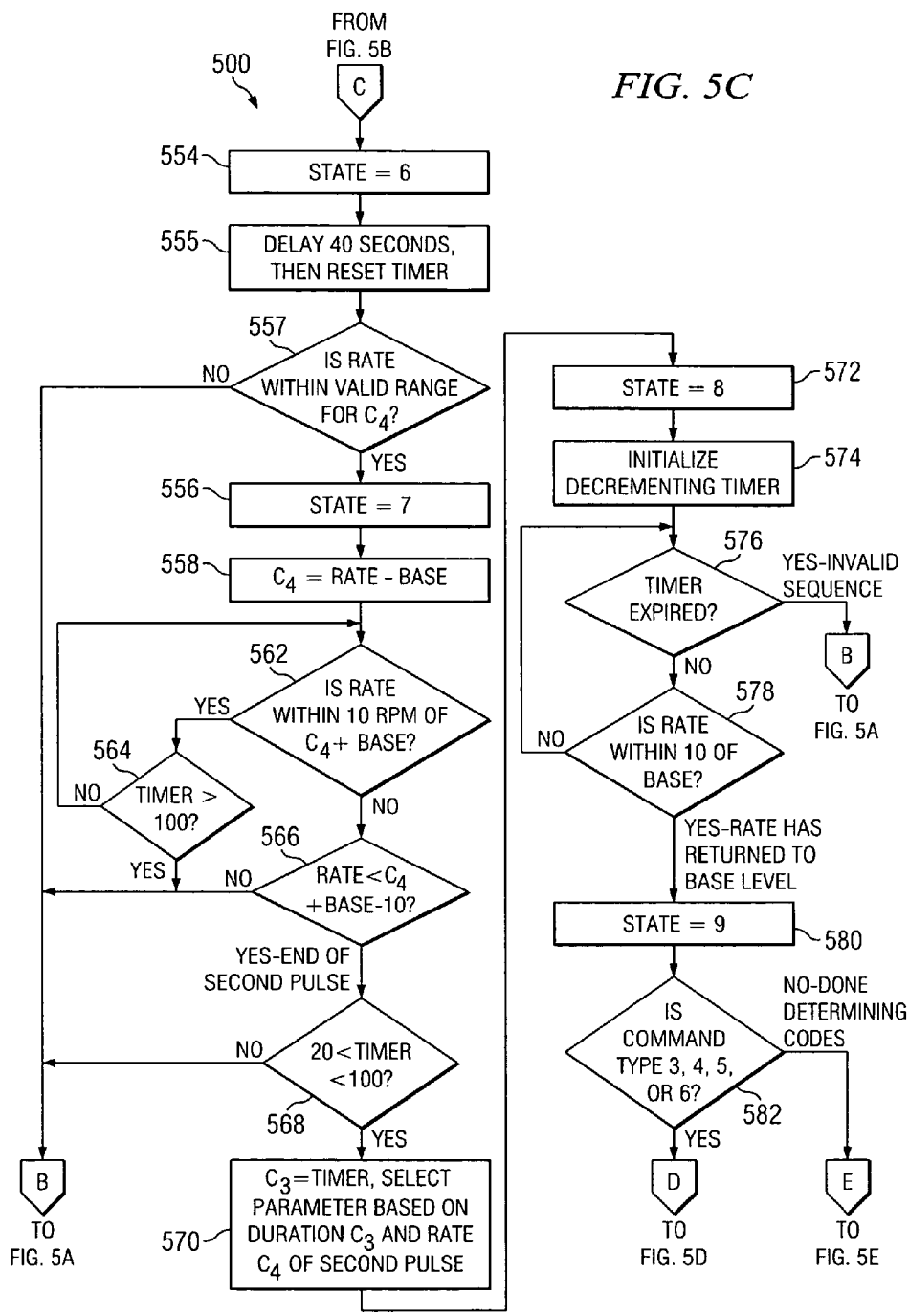

With reference now to FIG. 5C, STATE is set to 6 at 554 upon the detection of a valid second pulse. After a 40 second delay at 555 the most recently measured rotation rate is sampled to determine code $C_4$. If RATE is within the predefined valid range for code $C_4$ at 557, then STATE is set to 7 at 556 and code $C_4$ is set to RATE minus BASE at 558. RATE is then repeatedly sampled at 562 and 564 to determine the end of the second pulse, which is predefined in this particular embodiment to occur when the rate is detected to drop more than 10 RPM below $C_4$ plus BASE. When the end of the second pulse is detected at 566, the TIMER indicates the duration of the second pulse. If code $C_3$ is within the predefined range for the duration of the pulse at 568, then $C_3$ is set to the current value of TIMER at 570. However, if the rate increases more than 10 RPM above $C_4$ plus BASE before the end of the second pulse or if the duration of the pulse is not within a predefined valid range, then the code sequence is invalidated. Otherwise, one of a plurality of parameter options is selected based on the command types of codes $C_1$ through $C_4$, and by consulting the appropriate look up table in accordance with Tables 1 through 6 at 570. STATE is then set to 8 at 572 and TIMER is reset at 574. RATE is then repeatedly sampled at 576 and 578 to determine if the rotation rate drops to within 10 RPM of BASE. After 45 seconds if the measured rotation rate does not drop to within 10 RPM of BASE, then the current code sequence is invalidated. Otherwise, STATE is set to 9 at 580.

Figure 5D:
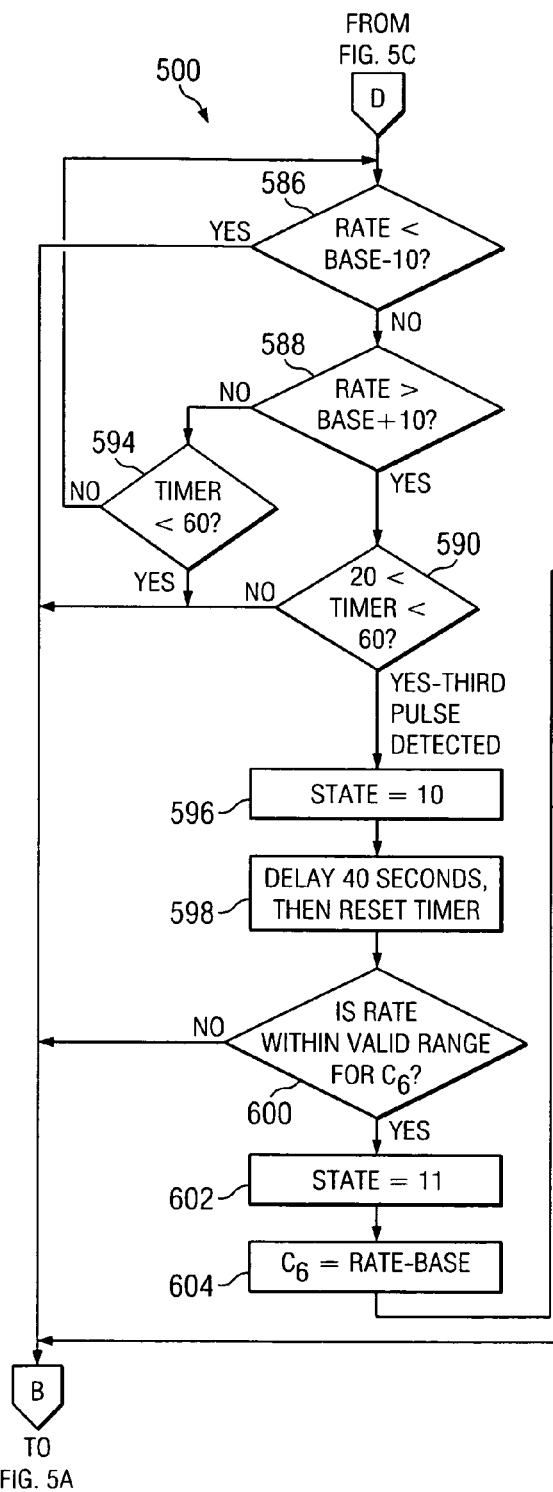
Figure 5D:
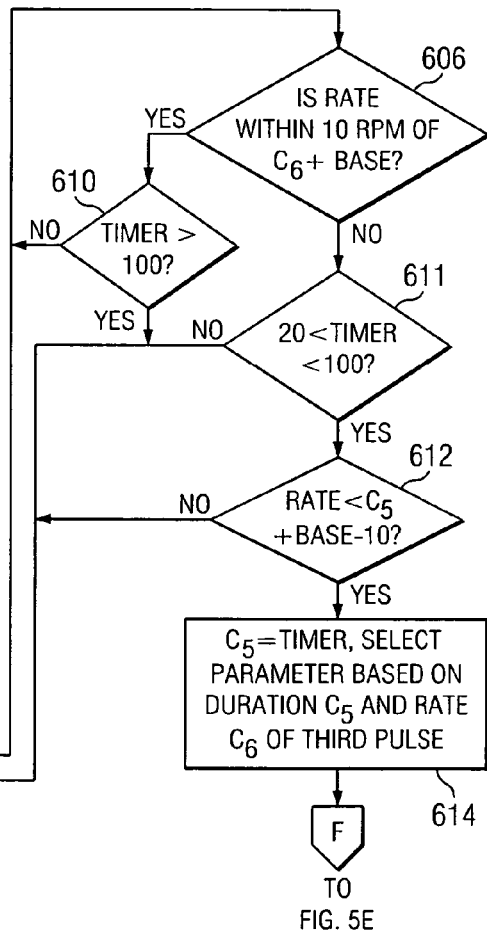
Figure 5E:
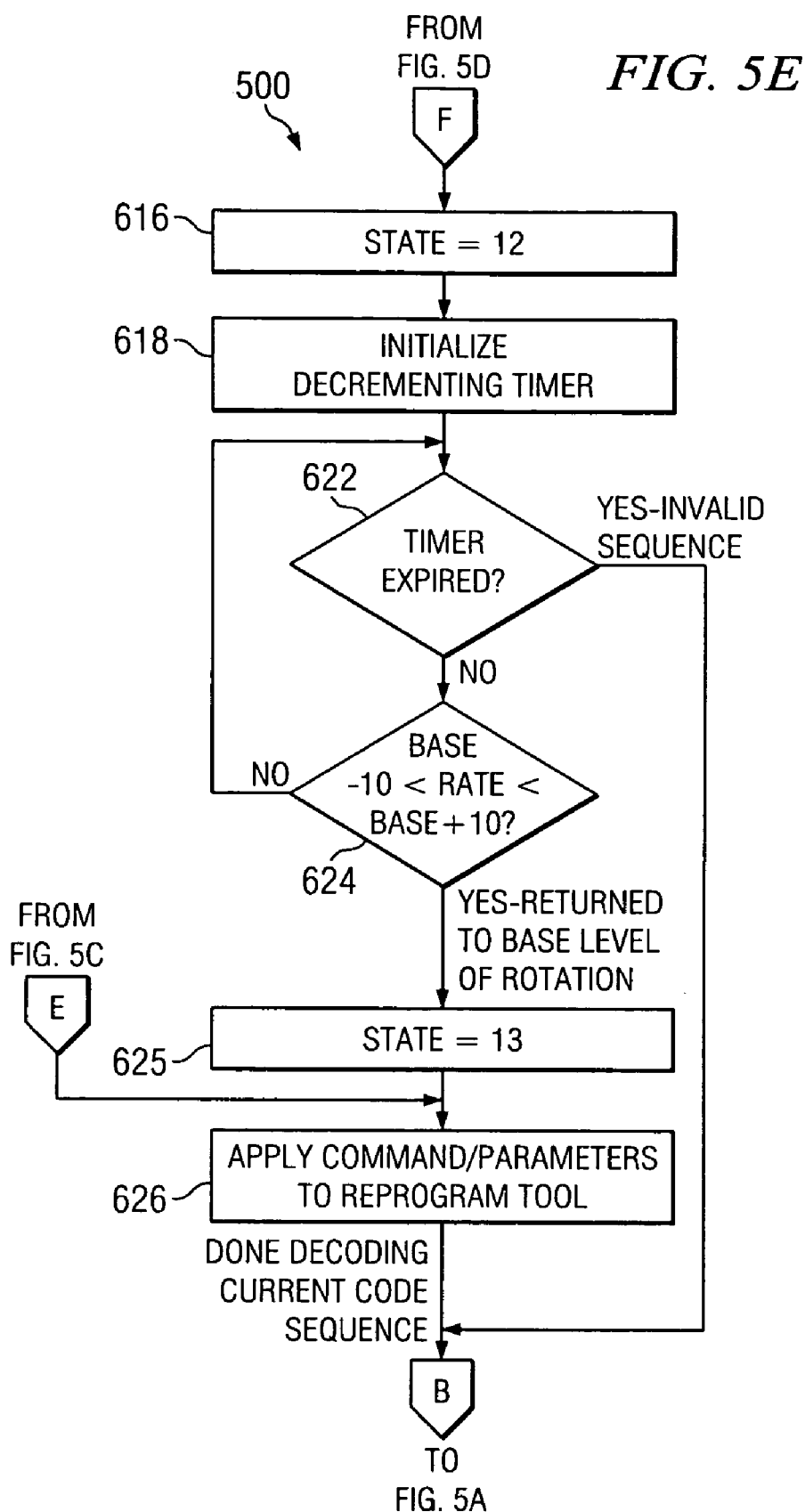

If the command type as indicated by code $C_1$ is type 3 through 6 at 582, then the current code sequence has been fully decoded and the program proceeds to 626 shown on FIG. 5E to apply the appropriate command to the directional drilling tool. Otherwise, if the command type is 1 or 2 at 582, the command sequence comprises three valid pulses, and, the program proceeds to 586 shown on FIG. 5D.

Referring now to FIG. 5D, RATE is repeatedly sampled at 586, 588, 590 and 594 to determine if the speed increases 10 RPM over BASE, indicating the detection of the third pulse. The rotation rate must remain within 10 RPM of BASE for at least 20 seconds and the third pulse must be detected within 60 seconds or the current code sequence is invalidated. Upon detection of the third pulse within the correct interval of time, STATE is set to 10 at 596. After a 40 second delay, TIMER is reset at 598 to measure the duration the third pulse for determining code $C_5$. The measured rotation rate is sampled to determine if RATE is within the valid range for $C_6$ at 600. If not, the code sequence is invalidated. Otherwise, STATE is set to 11 at 602 and $C_6$ is set to RATE minus BASE at 604. RATE is then sampled at 606, 610, 611, and 612 to detect the end of the third pulse as indicated by a decrease of more than 10 RPM below code $C_6$ plus BASE. If the rotation rate increases more than 10 RPM over $C_6$ plus BASE before the end of the pulse is detected, then the code sequence is invalidated at 606. When the end of the third pulse is detected, the TIMER indicates the duration of the third pulse. If TIMER is within the predefined duration of the third pulse then code $C_5$ is set to TIMER at 614. Otherwise, the code sequence is invalidated. The appropriate parameter is then selected based on the current command type for codes $C_5$ and $C_6$ at 614.

With reference now to FIG. 5E, STATE is set to 12 at 616 and TIMER is reset at 618. If the rotation rate does not drop to within 10 RPM of BASE before the timer expires (after 45 seconds of initialization in this embodiment), the current cycle is invalidated at 622 and 624. Otherwise, STATE is set to 13 at 625 and the decoded command (comprising the command type and one or two parameters) is applied to the directional drilling tool at 626. The program (i.e., the control loop) is then returned to step 501 on FIG. 5A to re-establish BASE and to wait for the next code sequence to be detected.

Although the present invention and its advantages have been described in detail, it should be understood that various changes, substitutions and alternations can be made herein without departing from the spirit and scope of the invention as defined by the appended claims.

We claim:

1. A method for communicating with a downhole device deployed in a subterranean borehole, the method comprising:
   (a) deploying a downhole device in a subterranean borehole, the device being coupled to a drill string, the drill string being rotatable about a longitudinal axis, the device including a measurement device operative to measure rotation rates of the drill string about the longitudinal axis;
   (b) predefining an encoding language comprising codes understandable to the downhole device, the codes represented in said language as predefined value combinations of drill string rotation variables, said variables including a difference between first and second rotation rates;
   (c) causing the drill string to rotate at substantially a preselected first rotation rate;
   (d) causing the drill string to rotate at substantially a preselected second rotation rate;
   (e) causing the measurement device to measure the first and second rotation rates; and
   (f) processing downhole the difference between the first and second rotation rates measured in (e) to determine if one of said variables is received and acquiring at least one code from the variable at the downhole device, wherein the difference is not based on a preselected base rotation rate.

2. The method of claim 1, wherein the first and second rotation rates are each within predefined ranges of rotation rates, and wherein all rotation rates within said ranges are operable to enable physical drilling of the borehole.

3. The method of claim 1, wherein the downhole device comprises a directional drilling tool.

4. The method of claim 3, wherein:
   the directional drilling tool comprises extendable blades, the blades being operative to control a direction of drilling of the subterranean borehole; and
   the at least one code comprises at least one command, the command causing the directional drilling tool to extend at least one blade to a pre-desired position.

5. The method of claim 1, wherein the downhole device comprises a substantially non-rotating housing.

6. The method of claim 5, wherein the measurement device includes a marker deployed on the drill string and a sensor deployed on the substantially non-rotating housing, the sensor disposed to detect the marker as it rotates by the sensor.

7. The method of claim 1, wherein the drill string rotation variables in (b) further include duration.

8. The method of claim 7, wherein (c) comprises rotating the drill string within a predefined range about the first rotation rate for a predetermined duration to establish a non-zero base rotation rate, and wherein the predefined value combinations of drill string rotation variables in (b) include the base rotation rate.

9. The method of claim 7, wherein (c) and (d) further comprise rotating the drill string within predefined ranges about the first and second rotation rates for corresponding first and second predetermined durations, and wherein (e) further includes measuring said durations.

10. The method of claim 9, wherein (f) further comprises processing the durations measured in (e) to acquire the at least one code in said language at the downhole device.

11. The method of claim 1, wherein the codes comprise commands, the commands operative to trigger predetermined responses in the downhole device.

12. The method of claim 11, wherein the downhole device executes the commands upon receipt thereof.

13. The method of claim 1, wherein (d) further comprises causing the drill string to rotate through a predefined sequence varying rotation rates, the sequence including the second rotation rate, the drill string rotation variables in (b) including at least one member of the group consisting of (i) a rotation rate at a predetermined time in the sequence and (ii) a duration of rotation during a predetermined portion of the sequence.

14. The method of claim 13, wherein the sequence comprises at least one pulse, the pulse including (i) a first transition in which the rotation rate changes from substantially the first rotation rate to substantially the second rotation rate and (ii) a plateau in which the rotation rate is within a predefined range of the second rotation rate for substantially a predetermined pulse duration.

15. The method of claim 14, wherein the pulse further comprises (iii) a second transition in which the rotation rate changes from substantially the second rotation rate to substantially the first rotation rate.

16. The method of claim 14, wherein:
(e) further comprises measuring the pulse duration, and
(f) comprises processing the pulse duration measured in (e) to acquire the at least one code in said language at the downhole device, the drill string rotation variables in (b) including the pulse duration.

17. The method of claim 1, wherein the first and second rotation rates are measured in (e) by timing a rotation of the drill string.

18. The method of claim 1, further comprising:
(g) receiving, at the surface, sensor data acquired by a sensor deployed in the subterranean borehole.

19. The method of claim 18, further comprising:
(h) responsive to the sensor data received at the surface in (g), receiving further codes in said language at the downhole device via further communication of predefined value combinations of drill string rotation variables.

20. A method for communicating with a downhole device deployed in a subterranean borehole, the method comprising:
(a) deploying a downhole device in a subterranean borehole, the device being coupled to a drill string, the drill string being rotatable about a longitudinal axis, the device including a measurement device operative to measure rotation rates of the drill string about the longitudinal axis;
(b) predefining an encoding language comprising codes understandable to the downhole device, the codes represented in said language as predefined value combinations of drill string rotation variables, said variables including a difference between a first preselected rotation rate and a second preselected rotation rate and a duration;
(c) causing the drill string to rotate at substantially a predefined first rotation rate for substantially a first predetermined duration;
(d) causing the drill string to rotate at substantially a predefined second rotation rate for substantially a second predetermined duration;
(e) causing the measurement device to measure the first and second rotation rates and the first and second durations; and
(f) processing downhole (i) the difference between the first and second rotation rates measured in (e) and (ii) at least one of the first and second durations measured in (e) to determine if one of said variables is received and acquiring acquire at least one code in said language at the downhole device, wherein the difference is not based on a preselected base rotation rate.

21. The method of claim 20, wherein the first and second rotation rates are within predefined ranges of rotation rates, wherein all rotation rates within said predefined ranges are operable to enable physical drilling of the borehole.

22. The method of claim 20, wherein:
the downhole device further comprises a directional drilling tool, the directional drilling tool including extendable blades, the blades being operative to control a direction of drilling of the subterranean borehole; and
the at least one code comprises at least one command, the command causing the directional drilling tool to extend at least one blade to a pre-desired position.

23. The method of claim 20, wherein:
the downhole device comprises a substantially non-rotating tool housing; and
the measurement device includes a marker deployed on the drill string and a sensor deployed on the tool housing, the sensor disposed to detect the marker as it rotates by the sensor.

24. The method of claim 20, wherein (d) further comprises causing the drill string to rotate through a predefined sequence of varying rotation rates, the sequence including the second rotation rate.

25. The method of claim 24, wherein the sequence comprises at least one pulse, the pulse including (i) a first transition in which the rotation rare changes from substantially the first rotation rate to substantially the second rotation rate and (ii) a plateau in which the rotation rate is within a predefined range of the second rotation rate for substantially the second predetermined duration.

26. The method of claim 25, wherein the pulse further comprises (iii) a second transition in which the rotation rate changes from substantially the second rotation rate to substantially the first rotation rate.

27. A method for communicating with a downhole device deployed in a subterranean borehole, the method comprising:
(a) deploying a downhole device in a subterranean borehole, the device being coupled to a drill string, the drill string being rotatable about a longitudinal axis, the device including a measurement device operative to measure a rotation rate of the drill string about the longitudinal axis;
(b) predefining an encoding language comprising codes understandable to the downhole device, the codes represented in said language as predefined value combinations of drill string rotation variables, said variables including (i) a first rotation rate, (ii) first and second durations, and (iii) a difference between a second rotation rate and a base rotation rate;
(c) causing the drill string to rotate at substantially the first rotation rate for substantially the first duration;
(d) causing the drill string to rotate at substantially the second rotation rate for substantially the second duration;
(e) causing the measurement device to measure the first and second rotation rates and the first and second durations;
(f) processing the first rotation rate and the first duration to establish the base rotation rate; and
(g) processing downhole (i) the difference between the second rotation rate measured in (e) and the base rotation rate established in (f) and (ii) the second duration measured in (e) to determine if one of said variables is received and acquiring at least one code from the variable at the downhole device, wherein the difference is not based on a preselected base rotation rate.

28. The method of claim 27, wherein:
the downhole device comprises a directional drilling tool, the directional drilling tool including extendable blades, the blades being operative to control a direction of drilling of the subterranean borehole; and
the code comprises at least one command, the command causing the directional drilling tool to extend at least one blade to a pre-desired position.

29. The method of claim 27, wherein:
the downhole device comprises a substantially non-rotating tool housing; and the measurement device includes a marker deployed on the drill string and a sensor deployed on the tool housing, the sensor disposed to detect the marker as it rotates by the sensor.

30. The method of claim 27, wherein (d) farther comprises causing the drill string to rotate through a predefined sequence of varying rotation rates, the sequence comprising at least one pulse, the pulse including (i) a first transition in which the rotation rate changes from substantially the base rotation rate to substantially the second rotation rate and (ii) a plateau in which the rotation rate is within a predefined range of the second rotation rate for substantially a predetermined pulse duration.

31. The method of claim 30, wherein the pulse further comprises (iii) a second transition in which the rotation rate changes from substantially the second rotation rate to substantially the base rotation rate.

32. A method for transmitting commands from a drilling rig to a downhole device deployed in a subterranean borehole, the method comprising:
(a) deploying a downhole device in a subterranean borehole, the device being coupled to a drill string, the drill string being rotatable about a longitudinal axis, the device including a measurement device operative to measure a rotation rate of the drill string about the longitudinal axis;
(b) predefining an encoding language comprising commands understandable to the downhole device, the commands represented in said language as predefined value combinations of drill string rotation variables, said variables including a difference between a pulse rotation rate and a base rotation rate and a pulse duration;
(c) establishing a base rotation rate by causing the drill string to rotate at substantially the first rotation rate for substantially a first predetermined duration;
(d) causing the drill string to rotate through a predefined sequence of varying rotation rates, the predefined sequence including a plurality of drill string rotation pulses, each of the pulses including (i) a first transition in which a rotation rate of the drill string transitions from substantially the base rotation rate to substantially the pulse rotation rate, (ii) a plateau in which the rotation rate of the drill string remains within a predefined range of the pulse rotation rate for substantially the pulse duration, and (iii) a second transition in which the rotation rate of the drill string transitions from substantially the pulse rotation rate to substantially the base rotation rate;
(e) measuring downhole (i) the base rotation rate, (ii) the pulse rotation rate of each pulse, and (iii) the pulse duration of each pulse; and
(f) processing downhole the difference between each of the pulse rotation rates measured in (e) and the base rotation rate measured in (3) and (ii) the pulse durations measured in (e) to determine if one of said variables is received and acquiring at least one command from the variable at the downhole device, wherein the difference is not based on a preselected base rotation rate.

33. In a downhole telemetry system in which drill string rotation variables are used to encode communication with a downhole device coupled to a drill string, an improved method for receiving at least one predefined code at the downhole device via a sequence of encoded drill string rotation variables, the improvements comprising:
(a) causing the drill string to rotate at first and second rotation rates;
(b) causing the downhole device to measure the first and second rotation rates; and
(c) calculating downhole a difference between the first and second rotation rates measured in (b) to determine if one of said variables is received and acquiring at least one code from the variable at the downhole device, wherein the difference is not based on a preselected base rotation rate.

34. A method for encoding a command transmitted from a drilling rig to a downhole steering tool deployed in a subterranean borehole, the method comprising:
(a) deploying the steering tool in the borehole, the steering tool being coupled to a drill string, the drill string rotatable about a longitudinal axis thereof, the steering tool further including a measurement device operative to measure a rotation rate of the drill string about the longitudinal axis;
(b) predefining an encoding language comprising commands understandable to the steering tool, the commands operative, when received by the steering tool, to trigger a predetermined response in the steering tool, the commands represented in said language and understandable by the steering tool as predefined value combinations of drill string rotation variables, said variables including (i) a difference between a second rotation rate and a base rotation rate and (ii) a pulse duration;
(c) establishing a base rotation rate by causing the drill string to rotate within a predefined range for substantially a first predetermined duration, wherein the base rotation rate is not predefined;
(d) commanding the steering tool by causing the drill string to rotate through a predefined sequence of value combinations of drill string rotation variables, the predefined sequence including value combinations of drill string rotation variables understandable by the steering tool as commands, the predefined sequence including at least one drill string rotation pulse in which the drill string rotates at the second rotation rate for the pulse duration.

35. The method of claim 34, wherein the base rotation rate and all rotation rates included in the predefined sequence are operable to enable physical drilling of the borehole.

36. The method of claim 34, wherein causing the drill string to rotate through a predefined sequence of value combinations of drill string rotation variables in (d) is accomplished manually.

37. The method of claim 34, wherein causing the drill string to rotate through a predefined sequence of value combinations of drill string rotation variables in (d) is computer-assisted.

38. A method for decoding a command at a downhole steering tool deployed in a subterranean borehole, the command represented as a unique value combination of drill string rotation variables in a predefined encoding language, the command operative to trigger a predetermined response in the steering tool, the method comprising:
(a) deploying the steering tool in the borehole, the steering tool including a rotatable shaft deployed in a substantially non rotating body, the non rotating body including at least one blade operative to deflect the steering tool in the borehole, the rotatable shaft being coupled to a drill string, the drill string rotatable about a longitudinal axis thereof, the steering tool further including a measurement device operative to measure a rotation rate of the drill string about the longitudinal axis;

(b) causing the measurement device to measure a rotation rate;

(c) assigning the rotation rate measured in (b) to a base rotation rate parameter upon satisfying a predetermined program condition;

(d) causing the tool to measure a plurality of parameters of a predefined code sequence of varying rotation rates, the plurality of parameters including (i) a rotation rate at a predetermined time in the code sequence and (ii) a duration of a predetermined portion of the code sequence;

(e) assigning (i) a difference between the rotation rate measured in (d) and the base rotation rate parameter assigned in (c) to a first measurement parameter and (ii) the duration measured in (d) to a second measurement parameter;

(f) determining the command in said language at the steering tool by processing downhole the first and second measurement parameters assigned in (e) to determine if one of said variables is received and acquiring at least one code from the variable at the downhole device, wherein the difference is not based on a preselected base rotation rate.

39. The method of claim 38, wherein the steering tool executes the command upon receipt.

40. The method of claim 38, wherein the measurement device includes a marker deployed on the drill string and a sensor deployed on the substantially non-rotating housing, the sensor disposed to detect the marker as it rotates by the sensor.

41. A system for decoding a command transmitted downhole to a downhole device, the command encoded via rotation of a drill string to which the downhole device is coupled, the command encoded as a predetermined value combination of drill string rotation variables, said variables including a difference between a first and second drill string rotation rates, the system comprising:

a measurement device deployed on the downhole device, the measurement device operative to measure rotation rates of the drill string and to send said measured rotation rates to a downhole controller;

the controller pre-programmed to give predefined command signals to the downhole device upon recognition of corresponding predefined value combinations of said drill string rotation variables;

the controller configured to:

(A) receive a first measured rotation rate of the drill string from the measuring device;

(B) receive a second measured rotation rate of the drill string from the measuring device;

(C) calculate the difference between the first measured rotation rate received in (A) and the second measured rotation rate received in (B) to identify a corresponding command signal; and (D) send said command signal to the downhole device.

42. The system of claim 41, wherein the drill string rotation variables further comprise duration, and wherein the controller is further configured to:

received from the measuring device (i) a first measured duration in (A) during which the drill string rotates at substantially the first measured rotation rate and (ii) a second measured duration in (B) during which the drill string rotates at substantially the second measured rotation rate; and process in (C) the second measured duration in combination with the difference between the first and second measured rotation rates to identify a corresponding command signal.

43. A computer-readable medium storing computer executable logic understandable by a downhole processor to enable the processor to perform a method for decoding a command transmitted downhole to a downhole device, the command encoded via rotation of a drill string to which the downhole device is coupled, the command encoded as a predetermined value combination of drill string rotation variables, said variables including a difference between first and second drill string rotation rates, the method comprising:

(a) receiving a first measured rotation rate of the drill string from a measuring device deployed on the downhole device;

(b) receiving a second measured rotation rate of the drill string from the measuring device;

(c) calculating the difference between the first measured rotation rate received in (a) and the second measured rotation rate received in (b) to identify a command signal via reference to a pre-programmed set of command signals corresponding to predefined value combinations of said drill string rotation variables; and (d) sending said command signal to the downhole device.

44. The computer-readable medium of claim 43, wherein the drill string rotation variables further comprise duration, and wherein:

(a) further comprises receiving a first measured duration during which the drill string rotates at substantially the first measured rotation rate;

(b) further comprises receiving a second measured duration in during which the drill string rotates at substantially the second measured rotation rate; and (c) further comprises processing the second measured duration first measured rotation rate and the first measured duration in combination with the difference between the first and second measured rotation rates in order to identify the command signal.

* * * * *